(12) United States Patent
Saeed et al.

(10) Patent No.: US 6,915,266 B1
(45) Date of Patent: Jul. 5, 2005

(54) METHOD AND SYSTEM FOR PROVIDING EVALUATION DATA FROM TRACKED, FORMATTED ADMINISTRATIVE DATA OF A SERVICE PROVIDER

(76) Inventors: Aysha Saeed, 19 Littlebrook Crossing, Farmington, CT (US) 06032; Azam Saeed, 19 Littlebrook Crossing, Farmington, CT (US) 06032

( * ) Notice: Subject to any disclaimer, the term of this patent is extended or adjusted under 35 U.S.C. 154(b) by 409 days.

(21) Appl. No.: 09/630,015

(22) Filed: Jul. 31, 2000

(51) Int. Cl.[7] ............................................. G06F 17/60
(52) U.S. Cl. .................... 705/2; 705/3; 705/4; 705/7; 705/10; 705/40; 709/201; 707/10
(58) Field of Search ........................... 705/2–4, 7, 10, 705/40; 709/201; 707/10

(56) References Cited

U.S. PATENT DOCUMENTS

| | | | |
|---|---|---|---|
| 4,491,725 A | | 1/1985 | Pritchard ........................ 705/2 |
| 4,858,121 A | | 8/1989 | Barber et al. ................... 705/2 |
| 5,070,452 A | | 12/1991 | Doyle, Jr. et al. ............... 705/2 |
| 5,253,164 A | * | 10/1993 | Holloway et al. .............. 705/2 |
| 5,301,105 A | | 4/1994 | Cummings, Jr. ................ 705/2 |
| 5,324,077 A | | 6/1994 | Kessler et al. ................. 283/54 |
| 5,627,973 A | * | 5/1997 | Armstrong et al. ........... 705/10 |
| 5,664,109 A | * | 9/1997 | Johnson et al. ................. 705/2 |
| 5,765,138 A | * | 6/1998 | Aycock et al. .................. 705/7 |
| 5,890,129 A | | 3/1999 | Spurgeon ........................ 705/4 |
| 5,915,241 A | | 6/1999 | Giannini ......................... 705/2 |
| 5,930,759 A | | 7/1999 | Moore et al. ................... 705/2 |
| 5,950,169 A | | 9/1999 | Borghesi et al. ................ 705/4 |
| 5,995,939 A | | 11/1999 | Berman et al. ................. 705/3 |
| 6,012,035 A | | 1/2000 | Freeman, Jr. et al. ........... 705/2 |
| 6,112,183 A | * | 8/2000 | Swanson et al. ................ 705/2 |
| 6,119,093 A | * | 9/2000 | Walker et al. ................... 705/4 |
| 6,208,973 B1 | * | 3/2001 | Boyer et al. .................... 705/2 |
| 6,272,528 B1 | * | 8/2001 | Cullen et al. ............... 709/202 |
| 6,283,761 B1 | * | 9/2001 | Joao ............................ 434/236 |
| 6,311,170 B1 | * | 10/2001 | Embrey ........................ 705/40 |
| 6,453,297 B1 | * | 9/2002 | Burks et al. .................... 705/3 |
| 6,457,049 B2 | * | 9/2002 | Lewis et al. ................. 709/223 |
| 6,466,919 B1 | * | 10/2002 | Walker et al. ................ 705/37 |
| 6,473,805 B2 | * | 10/2002 | Lewis ......................... 709/246 |
| 2002/0111886 A1 | * | 8/2002 | Chenevich et al. ........... 705/30 |

FOREIGN PATENT DOCUMENTS

WO     WO 03/094062 A2 * 11/2003 ........... G06F/17/60

OTHER PUBLICATIONS

Why Non–Health care payers are automating claims?, Automated Medical Payments News, v3, n3, May 6, 1994, Dialog # 02368138/ 636.*

Frook, John Evan, Digital Divide over using the internet for billing, InternetWeek, Jun. 15, 1998, n719 p. 9, Dialog # 00498423/9.*

* cited by examiner

*Primary Examiner*—Joseph Thomas
*Assistant Examiner*—Carolyn Bleck
(74) *Attorney, Agent, or Firm*—McCormick, Paulding & Huber LLP

(57) ABSTRACT

An agent-neutral computerized method for processing administrative data of a medical service provider, including defining standard administrative data formats for use by a medical service provider system, a coordinator system, and a plurality of practice management agent systems, in creating and processing administrative data. The method also includes creating neutral evaluation data for the agent-neutral coordinator system by tracking administrative data transferred between the medical service provider system and the practice management agent systems, wherein the administrative data is in the standard administrative data formats. The method further includes providing the neutral evaluation data to the medical service provider system for selection of a first practice management agent system from the plurality of practice management agent systems, wherein the agent-neutral coordinator system reduces financial and operating costs for switching from the first practice management agent system to a second practice management system.

8 Claims, 11 Drawing Sheets

METHOD AND SYSTEM FOR PROVIDING EVALUATION DATA FROM TRACKED, FORMATTED ADMINISTRATIVE DATA OF A SERVICE PROVIDER

FIELD OF THE INVENTION

The present invention relates generally to a method and system for providing administrative services to a medical service provider, and more specifically to a method and system of practice management agents employing agent-neutral standardized administrative procedures and computer system formats established and maintained by a coordinator for supplying administrative services to a medical service provider.

BACKGROUND OF THE INVENTION

The health care system in the United States has gone through a process of rapid evolution over the past three decades. Factors, including the increasing role of the government, the rise in health care costs, and the advent of "managed care", have resulted in the growth of the bureaucracy for administering the health care system. The increased bureaucracy has greatly increased the clinicians' and the medical service providers' administrative work, and severely constrained the physician's ability to control the medical care delivery process. In addition, the reimbursement system has become too convoluted to understand for an ordinary person.

As shown in FIG. 1, a medical service provider must manage many types of administrative processes to conduct the billing and reimbursement process, including: credentialing of every medical service provider, such as a medical practice or physician, by each managed care entity on a periodic basis; service contracts that each medical service provider has to make with the various insurance companies; the process of claim submission to the various payers; the follow-up required, from the resubmission of "lost" claims to the petitions against denied claims; management of the reimbursement information to help the medical service provider's decision-making process; and resolution of continuing issues about patient care or reimbursement for services provided. New products and services which have been introduced to reduce costs to both payer and purchaser, such as health maintenance organizations, preferred provider organizations, and point of service health plans, often cause obstacles which make the administrative process a losing proposition for the medical service provider.

For instance, the medical service provider's office has to be able to distinguish between the various provisions and rules of various programs offered by each company, in addition to dealing with numerous insurance companies, managed-care entities and governmental programs such as Medicare and Medicaid. In addition, there are wide variations in payment rates, authorized procedures, drug formularies, co-pays, risk deductions, and other adjustments in different insurance plans. The current billing and reimbursement methodology results in a highly fragmented process in which various responsibilities may lie with various participants, while the ultimate administrative burden remains on the medical service provider.

The remedies offered the medical service provider thus far have been piecemeal and inadequate to relieve the problem. Following is a brief description of remedial methodologies:

In a direct billing methodology, as shown in FIG. 2, the medical service provider purchases and deploys sophisticated practice management software, and then independently handles the billing and collection process in-house. The direct billing method raises two concerns. First, it leaves all the administrative burden of dealing with managed care squarely on the shoulders of the medical service provider. This is not acceptable to solo practitioners or small practices. Second, the small medical service provider has no bargaining power vis-à-vis the large payers and bureaucracies, such as insurance companies and managed-care entities. A variation of the direct billing system is a Web-based billing system, which is likely to make obsolete the small billing agencies, and may ultimately add to the administrative burden of small medical service provider.

The direct billing methodology provides only limited help to a medical service provider in effectively dealing with the administrative problem of managed care. Small medical service providers lack the resources, such as technical expertise or financial wherewithal, to install and manage highly complex computer systems. In a Web-based billing system, the medical service provider must simultaneously use two different systems to fulfill its needs, which is financially expensive and technologically complex. As managed care becomes more powerful and complex, a lack of access to a sophisticated information system could impair a medical service provider's ability to make sound commercial decisions. In addition, the problem of a high administrative burden for the medical service provider remains unsolved.

In a billing intermediary methodology, as shown in FIG. 3, the medical service provider outsources the billing and collection responsibility to an outside third-party, such as a billing firm, a medical service organization or a practice management service. The medical service provider provides the information from a patient's super bill to the billing firm who enters the information in its computer system for submission to various payers. The super bill is an encounter form listing possible billable conditions for a patient, which is easily filled out by the medical service provider. The patient's super bill information is stored by a medical service provider system in a data format required by the particular billing firm. A variation may be when the medical service provider performs the data entry, and the billing firm does the rest. The billing firm provides periodic reports to the medical service provider.

The billing intermediary methodology has serious drawbacks. First, the billing firm's role is very limited in the value it adds. The billing firm bills and collects but takes no responsibility for the administrative headaches of the medical service provider, such as credentialing of every medical service provider by each managed care entity on a periodic basis; service contracts that each medical service provider has to make with the various insurance companies; management of the reimbursement information to help the medical service provider's decision-making process; and resolution of continuing issues about patient care or reimbursement for services provided.

Second, this method, in its current form, is not amenable to competition. The costs of switching from the billing firm to a second billing firm are high because reliable information is not readily available about such billing firms, and because the medical service provider often has to change from a computer system compatible with the first billing firm's computer system to another computer system compatible with the second billing firm's computer system. The switch may also require the medical service provider to change operational procedures, such as the time period for generating invoices.

Medical service providers have also attempted to overcome the administrative problems of effectively dealing with managed care by increasing the size of medical service provider groups. The physician practice management (PPM) model symbolized the culmination of this trend. However, medical service providers are realizing that the costs of such arrangements often exceed the benefits. While the physician practice management model addresses the problem of administrative burden by taking over that responsibility, the physician practice management model removes the ownership of the practice and some operational control from the medical service provider.

Models such as physician-hospital organization or independent practice association do not even claim to solve the administrative problems in general. They are targeted specifically to contracting issues. Hence they fall well short of solving the administrative problems of effectively dealing with managed care. In short, the medical service provider is still looking for an efficient and cost-effective system to help remedy the administrative conundrum of practicing medicine in general and the convoluted health care reimbursement system in particular.

An object of the present invention is to provide a medical service provider with the ability to search for and choose, as and when needed or desired, from a number of qualified practice management agents readily available on the same Internet-integrated system, which practice management agents would then take the responsibility for managing the administrative processes of the medical service provider including billing and collection.

Another object of the present invention is to allow a medical service provider to make a selection of the practice management agent without material switching costs, without the need to change the hardware or software the medical service provider uses, and without the need to change any protocols the medical service provider follows in its office management or information management procedures.

Another object of the present invention is to provide a singular, vendor-neutral, Internet-integrated computer system that can be used to manage virtually all of a medical service provider's administrative processes without having to integrate various computer and administrative systems.

Another object of the present invention is to make available on the Internet, in a vendor-neutral format, a network of independent practice management agents, each of whom would be able to take over the complete responsibility of managing the billing and collection process for the medical service provider, and which would act as an administrative agent of the medical service provider in regard to its dealings with insurance companies and payers.

Another object of the present invention is to let remain with the medical service provider control of the administrative process, including control over the medical service provider's confidential information, despite the fact that the administrative process management responsibility would be outsourced to independent practice management agents.

SUMMARY OF THE INVENTION

An agent-neutral computerized method for processing administrative data of a medical service provider, includes defining standard administrative data formats for use by a medical service provider system, a coordinator system, and a plurality of practice management agent systems, in creating and processing administrative data. The method also includes creating neutral evaluation data for the agent-neutral coordinator system by tracking administrative data transferred between the medical service provider system and the practice management agent systems, wherein the administrative data is in the standard administrative data formats. The method further includes providing the neutral evaluation data to the medical service provider system for selection of a first practice management agent system from the plurality of practice management agent systems, wherein the agent-neutral coordinator system reduces financial and operating costs for switching from the first practice management agent system to a second practice management system.

An agent-neutral system for providing administrative services for a medical service provider, including an agent-neutral coordinator system for standardizing administrative data formats for processing administrative data of a medical service provider system by a first practice management agent system. The coordinator system provides data access authorization and security for the administrative data of the medical service provider system to the first practice management agent system, and provides evaluation data from the first practice management agent system for evaluation by the medical service provider system. The standardized administrative data format substantially eliminates costs incurred by the medical service provider system for switching from the first practice management agent system to a second practice management agent system.

DETAILED DESCRIPTION OF THE PREFERRED EMBODIMENT

Figure 1:
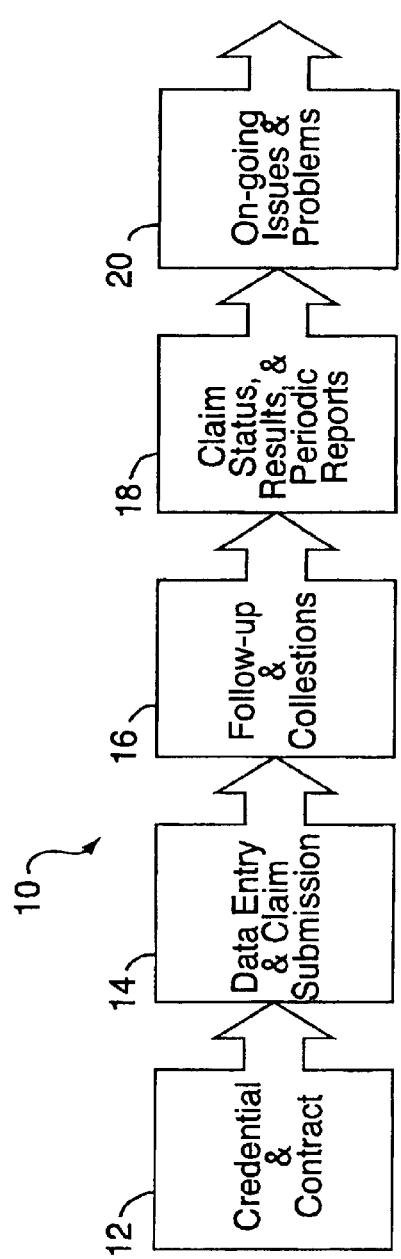
FIG. 1 is a block diagram illustrating the types of administrative processes conducted by a medical service provider for billing and reimbursement.
Figure 3:
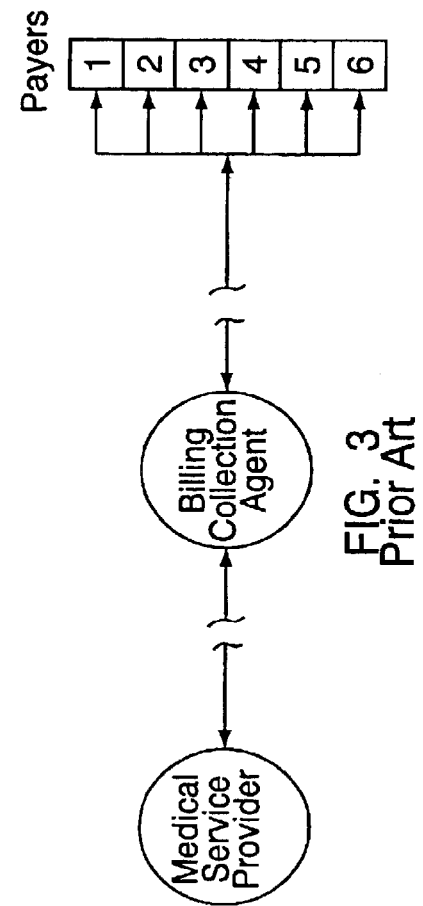
FIG. 3 is a block diagram illustrating a model of a billing intermediary methodology.
Figure 2:
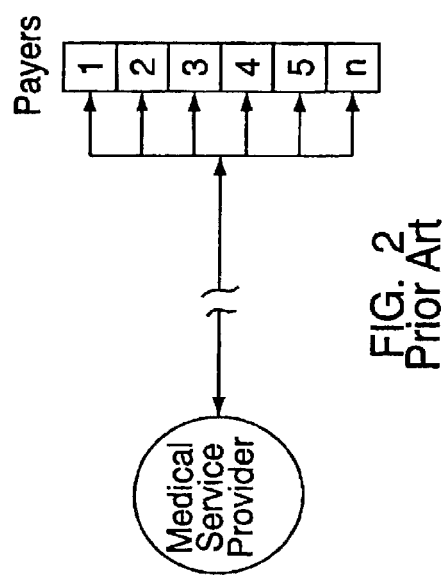
FIG. 2 is a block diagram illustrating a model of a direct billing methodology.

The present invention reduces the transaction costs of conducting administrative processes and reduces and substantially eliminates the financial and operational costs to medical service providers, such as medical practices and physicians, of switching between practice management agents, such as practice management firms and billing firms. Referring to FIG. 1, the method and system of the present invention transforms the narrow role of the practice management agent from acting as just a billing firm to encompassing an entire list of complex administrative processes necessary to conduct and complete a billing and reimbursement process 10, including credentialing and contracting processes 12, data entry & claim submission processes 14, follow-up and collections processes 16, generation of claim status, results, and periodic reports processes 18, and resolution of ongoing issues and problems processes 20.

Figure 4:
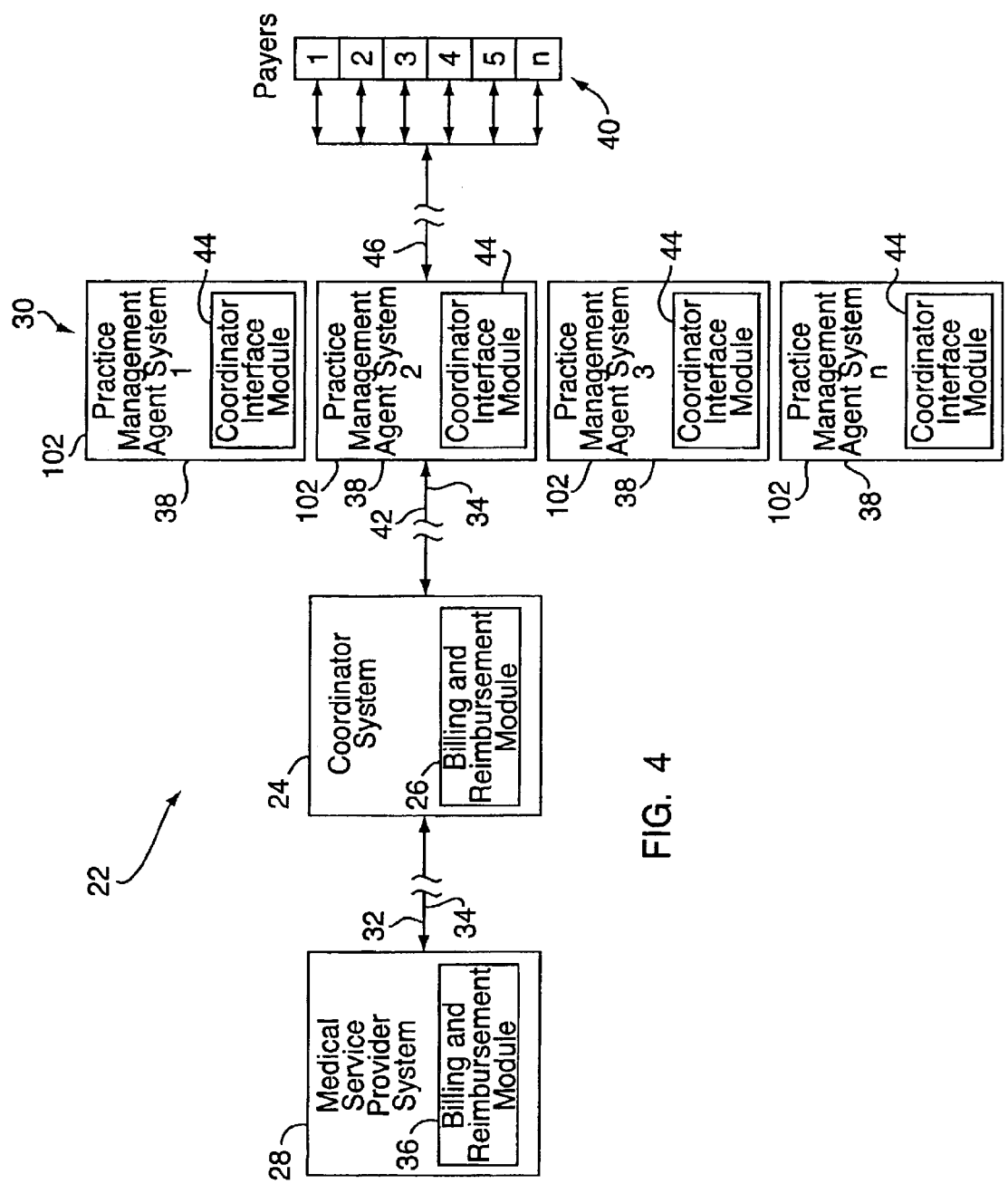
FIG. 4 is a block diagram illustrating a model of a agent-neutral system and methodology implemented on a computer system in accordance with an embodiment of the present invention.

Referring to FIG. 4, an embodiment 22 of a method and system of the present invention includes a coordinator system 24 for establishing data format standards and operational standards. The coordinator system 24 provides a billing and reimbursement module 26 to a medical service provider system 28 for creation of administrative data in the coordinator system data format. The coordinator billing and reimbursement module 26 enables the processing of the medical service provider system 28 administrative data by providing the standard administrative data format for processing by practice management agent systems 30. The coordinator system 24 provides a singular, agent-neutral, Internet-integrated computer system that can be used to manage virtually all of a medical service provider's 28 administrative processes without having to integrate various computer and administrative systems of the medical service provider system and the practice management agent systems 30. While a coordinator supplied billing and reimbursement module for creation of administrative data has been shown and described, the present invention is not so limited, as the billing and reimbursement module could also include additional functions, such as patient appointment scheduling and patient data management, without departing from the broader aspects of the present invention.

Continuing to refer to FIG. 4, the administrative data is transferred from the medical service provider system 28 to the coordinator system 24 through a communication link 32 which is part of a network 34, preferably the internet 34. The use of the internet 34 reduces the difficulties of communication between the medical service provider system 28, the coordinator system 24 and the practice management agent systems 30. The use of internet standards for communications means the medical service provider 28 will not have to worry about integrating two or three disparate types of services or computer systems to communicate internally or with the coordinator system 24 or the practice management agent systems 30. While the use of the internet has been shown and described, the present invention is not limited in this regard as other types of networks, such as intranets, extranets, lans and wans, can be substituted without departing from the broader aspects of the present invention.

Still referring to FIG. 4, the coordinator system 24 is a third party which objectively manages the communication between the medical service provider system 28 and the practice management agent systems 30. The coordinator system 24 establishes the standards by which the medical service provider system 28 creates administrative data, and provides the billing and reimbursement module 26 which the medical service provider system uses to enter the administrative data, such as a super bill, in the coordinator defined format. The super bill is an encounter form listing possible billable conditions for a patient, which is easily filled out by the medical service provider 28 and stored in the medical service provider system by a billing and reimbursement module 36 downloaded from the coordinator system 24. The coordinator system 24 provides security for communication between the medical service provider system 28 and the practice management agent systems 30, and enables the medical service provider to select a practice management agent system 38 from a group of practice management agents, as will be later described in more detail. The present invention increases the efficiency and profitability of the medical service provider 28 by mitigating the medical service provider's lack of resources, technological know-how, and expertise in dealing with payer systems 40, such as managed care entities.

Continuing to refer to FIG. 4, the selected practice management agent 38 communicates with the coordinator system 24 via a network 42, preferably the internet 34, for securing authorization to access the administrative data generated by the medical service provider system 28. The selected practice management agent system 38 provides administrative services to the medical service provider system 28, which can include: the credentialing of every medical service provider 12, such as a medical practice or physician, by each managed care entity on a periodic basis; negotiating the service contracts 12 that each medical service provider has to make with the various insurance companies; the process of claim submission to the various payers; the follow-up required 16, from the resubmission of "lost" claims to the petitions against denied claims; the management of the reimbursement information to help the medical service provider's decision-making process 18; and the resolution 20 of continuing issues about patient care or reimbursement for services provided. While the administrative services which the practice management agent can provide have been listed, the present invention is not so limited, as the practice management agent administrative services may also include maintenance of patient database and medical records, management of regulatory data and updates, and management of insurance related data and updates, without departing from the broader aspects of the present invention.

Still referring to FIG. 4, the practice management agent systems 30 include a coordinator interface module 44 for accessing the administrative data which is generated in the data format established by the coordinator system 24. The coordinator interface module 44 transfers the administrative data from the coordinator system 24 to the practice management agent system 38. The coordinator interface module 44 also performs a reverse transaction and transfers processed administrative data from the practice management agent system 38 to the coordinator system 24. The coordinator system 24 transfers the processed administrative data to the medical service provider system 28. The practice management agent systems 30 also provides practice management agent evaluation data so that the medical service provider 28 can select the practice management agent system 38 from a plurality of practice management agents 30. While having the medical service provider system select from four practice management agents been shown and described, the present invention is not limited in this regard as virtually any number of practice management agents are available to be selected, without departing from the broader aspects of the present invention.

Continuing with FIG. 4, the practice management agent systems 30 communicate with a number of different payer systems 40, such as insurance companies, managed care companies, and the federal government, in order to continue the reimbursement process for the medical service provider system 28. The practice management agent systems 38 communicate with multiple payer systems 40 on behalf of the medical service provider system 28. The communication with the payer systems 40 is via such methods as dial-up data lines, as is well known in the art, but communication can be by any other means, such as the internet, without departing from the broader aspects of the present invention. The data formatting and operational requirements of payer systems 40 for processing administrative data, such as billing data, are unchanged from current payer systems. The practice management agent systems 30 relieve the medical service provider system 28 of the responsibility of performing any transformations of administrative data, such as billing data, required for payer system 40 processing of the administrative data, as the practice management agent systems provide the operational and administrative data transformations required for payer system processing of medical service provider system administrative data. While six payers have been shown and described, the present invention is not limited in this regard as an unlimited number and types of payers, such as different types of insurance companies and direct payers, can be substituted without departing from the broader aspects of the present invention.

Still referring to FIG. 4, the medical service provider system 28 selects one of the practice management agent systems 30 in a selection process facilitated by the coordinator system 24, as described in greater detail later. While four practice management agents have been shown and described, the present invention is not limited in this regard as virtually any number of practice management agents can be substituted without departing from the broader aspects of the present invention. The selected practice management agent system 38 is the agent of the medical service provider system 28 for the billing and reimbursement process 10 and processing of related administrative data with payer systems 40.

Still referring to FIG. 4, the selected practice management agent system 38 communicates with the coordinator system 24 and the medical service provider system 28 over the network 34. The practice management agent systems 30 communicate with the payer systems 40, and vice versa, utilizing methods commonly known in the art. The payer systems' 40 method of communication is not dependent upon the coordinator system 24. The transfer of the medical service provider administrative data is supervised and tracked by the coordinator system 24, which is responsible for ensuring data security and the overall integrity of the process. The coordinator system 24 provides software, such as the billing and reimbursement module 26 and the coordinator interface module 44, to the medical service provider system 28 and the practice management agent systems 30 so that the medical service provider system and the practice management agent systems use the same administrative data formats and procedures for creating, reading and processing the medical service provider administrative data.

Figure 8:
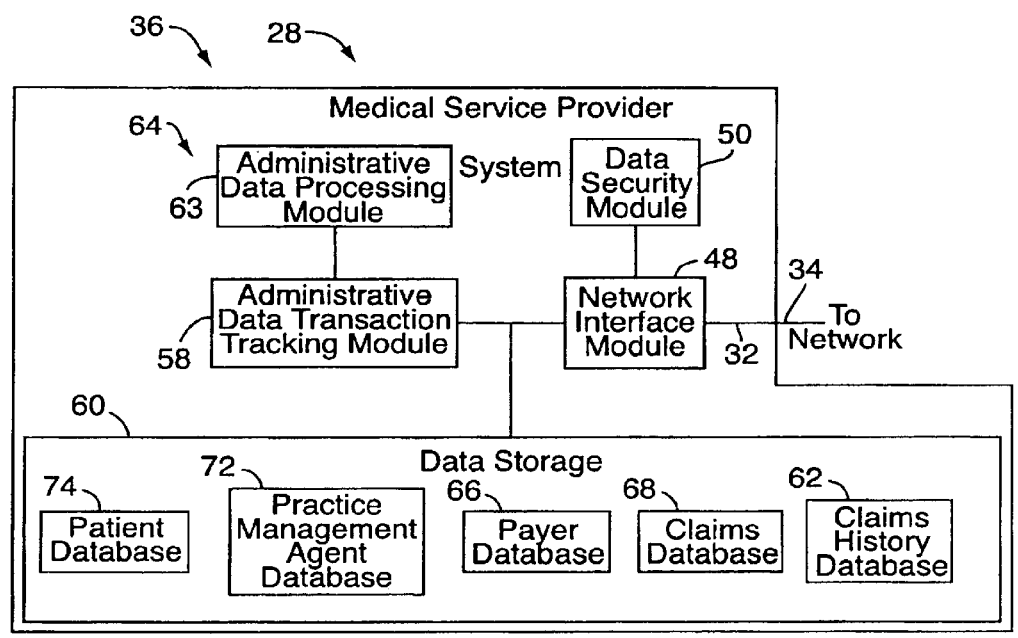
FIG. 8 is a block diagram illustrating a medical service provider computer system, in accordance with the agent neutral system of FIG. 4.

Referring to FIG. 8, the medical service provider computer system 28 includes a network interface module 48 to communicate with the coordinator system 24, and to search, evaluate and select the practice management agent system 38 from the plurality of practice management agent systems 30. The medical service provider system 28 has a web-integrated, thin-client architecture that minimizes the amount of computer equipment and training costs, and allows for computer equipment independence. The network interface module 48 is in communication with a data security module 50 for providing end-to-end security infrastructure, such as firewalls to shield the servers from outside view, and encryption technology to protect data during its transmission. The issue of data confidentiality and security is of prime importance in such a setup since the concern about protecting information is shared equally by the medical patient as well as the medical service provider system 28. The data security module incorporates techniques, such as user names and passwords, to maintain the security and confidentiality of information. While a security infrastructure has been shown and described, the present invention is not so limited in this regard, as other security measures, such as secured socket layers (SSL) to support encryption, and digital certificates for authenticating the user, can be substituted without departing from the broader aspects of the present invention.

Continuing to refer to FIG. 8, the authentication of various users, such as medical service provider system 28 and practice management agent systems 30, attempting to access the coordinator system includes validating user entered user names and passwords against preset security data, such as user names and passwords, stored in a coordinator system data storage 52. Additional security measures to strengthen the coordinator system's 24 ability to verify the authenticity of the user also serve to verify the integrity of the message and the data contained therein, thus assuring that the data being exchanged has not been altered during transmission. Encryption prevents a potential exposure to confidential data through eavesdropping. Encryption techniques implemented in the medical service provider system data security module 50 may involve digital signatures, hash algorithms, as well as symmetric and asymmetric keys. The practice of using cryptographic protocols is well known in the art and need not be defined further in this document. The coordinator system data security module 54 and the practice management agent systems data security module 56 have security features which interface with and are compatible with each other and the medical service provider system data security module 50.

Still referring to FIG. 8, the medical service provider system 28 includes an administrative data transaction tracking module 58 in communication with the network interface 48 for tracking the generated administrative data and the processed administrative data provided by the selected practice management agent system 38 for reporting and auditing purposes. The transaction tracking module 58 collects and stores, in a medical service provider storage area 60, all the administrative data on a transaction by transaction basis for future audits and information tracking. The transaction tracking module 58 is designed to monitor and track the internal use of the medical service provider system 28 and is supplemental to an audit trail created by the coordinator system 24. The tracked administrative data is stored in a claims history database 62 in the data storage 60 of the medical service provider system 28.

Continuing to refer to FIG. 8, the medical service provider system 28 uses an Intel Pentium microprocessor and Microsoft Windows operating system. The medical service provider system includes user interface devices such as a keyboard, mouse, display screen, printer and other hardware such as a scanner, and can be a client computer or a server computer. The billing and reimbursement module 36, including an administrative data processing module 63, is downloaded over the network from the coordinator system 24 via on-line download directly from the coordinator system's web-site portal. While downloading via the internet has been shown and described, the present invention is not limited in this regard, as the software could also be provided to the medical service provider system via CD-ROMs, floppy disks, or even in the form of an application service provider which provides the functions of the software without having the program reside within the medical service provider system, can be substituted without departing from the broader aspects of the present invention. While a medical provider system including an Intel Pentium micro processor and Windows operating system has been shown and described, the medical service provider system is not limited in this regard, as the system may be put together from the various hardware and operating systems available in the market as long as such components can be made adequately compatible to communicate with the coordinator system, without departing from the broader aspects of the present invention.

Continuing to refer to FIG. 8, the medical service provider system 28 includes the data storage 60 in communication with the software modules 64 of the medical service provider system. The data storage 60 is preferably a hard disk magnetic or optical storage, although other types of storage, such as flash memory or CD-ROM storage, may be used without departing from the broader aspects of the present invention. The data storage 60 includes a payer database 66 containing the identification of a patient's payer and the type of plan, such as private insurance plan or government plan, under which the patient is covered. The data storage also includes a claims database 68 which includes the medical service provider generated administrative data transactions, such as the super bill. The claims history database 62 includes the administrative data transactions that are used for audits and information tracking.

Still referring to FIG. 8, a medical service provider system practice management agent system database 72 includes data used for selecting practice management agents, and further data regarding the practice management agent system 38 selected by the medical service provider system 28. The medical service provider system 28 also includes a patient database 74 which includes data regarding patient account balances, and types of patient billing and reimbursement plans, as well as other data used for creating and submitting patient invoices. While medical service provider system databases, such as payer, claims, and claims history databases, have been shown and described, the present invention is not limited in this regard, as other databases which may become necessary for regulatory or market conditions, such as a claim fulfillment database and consumer information databases, may be added without departing from the broader aspects of the present invention.

While the above embodiment describes a single computer acting as the medical service provider system, the present invention is not limited in this regard, as the medical service provider system functionality could be distributed over a number of machines in a distributed architecture such that the various components of the system are housed in separate hardware units at different physical locations, such as separating the data processing function from the database storage function and networking many computers together via a wide area network that function in a synchronized unison to give the appearance of a single medical service provider system. While the above embodiment describes software modules having certain functions and in communication with each other in a particular order, the present invention is not limited in this regard, as the functions performed by each module may be distributed among other software modules, and such modules may be distributed across many computers and the modules can be in communication with each other in various order, as long as the described functions are performed, without departing from the broader aspects of the present invention.

Figure 9:
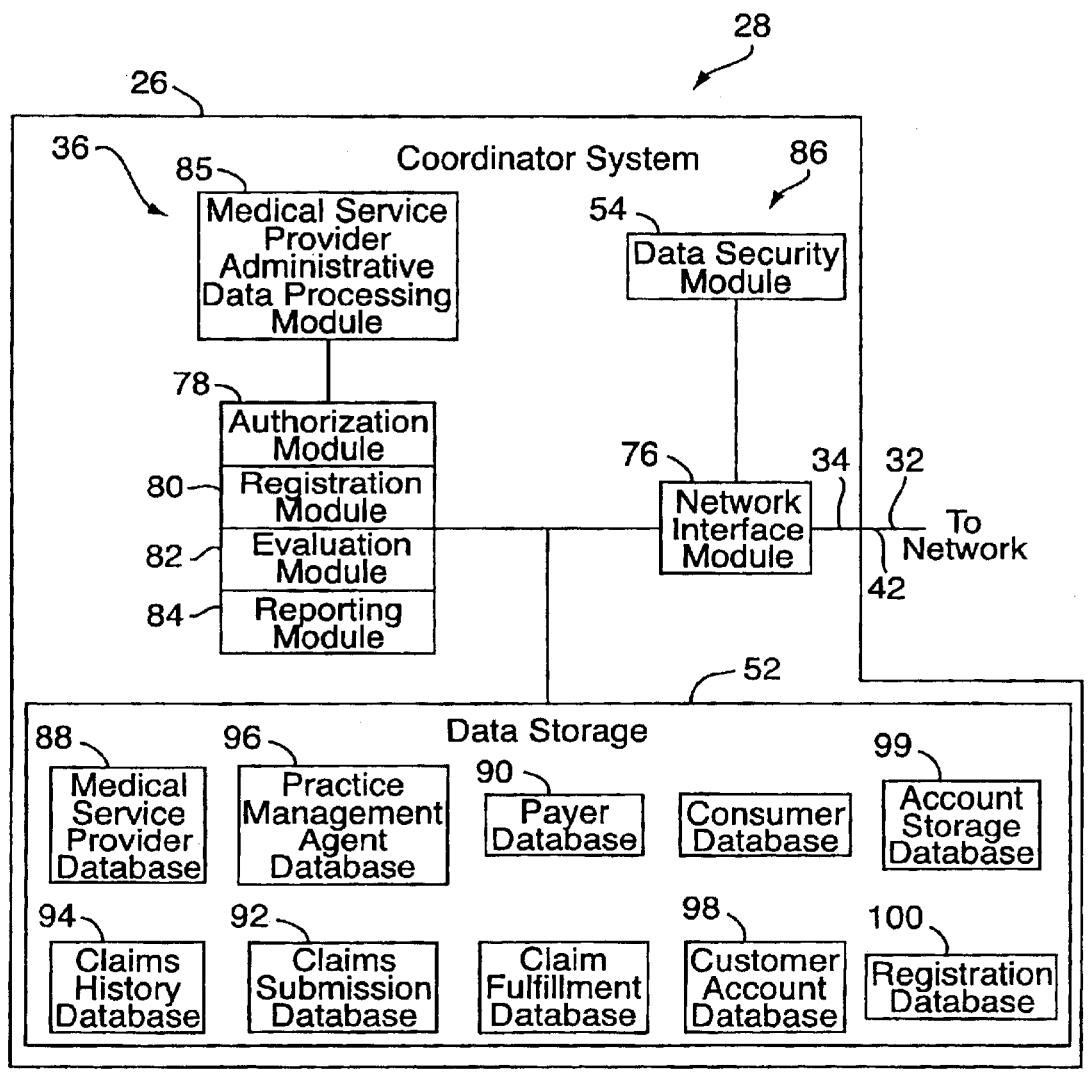
FIG. 9 is a block diagram illustrating a coordinator computer system, in accordance with the agent neutral system of FIG. 4.

Referring to FIG. 9, the coordinator system 24 is a third party which serves as a trusted source of objective information that is used by the medical service provider system 28 and the practice management agent systems 30 in their decision-making processes. Being impartial and independent, the coordinator system 24 also serves as the ideal trustee to track and maintain the storage area 52 for holding administrative data transactions that are readily accessible for audits and reporting. In addition, given such an impartial role, the coordinator system 24 acts as a mediator to resolve minor issues and disputes between the medical service provider system 28 and the practice management agent systems 30, thus reducing costs of performing business.

Continuing to refer to FIG. 9, the coordinator system 24 includes a network interface module 76 to communicate with the medical service provider system 28 and the practice management agent systems 30. The network interface module 76 is in communication with the coordinator system data security module 54 for providing end-to-end security infrastructure. The coordinator system's data security module 54 is compatible with the medical service provider system's data security module 50 and the practice management agent systems' data security module 56, and includes security features as described for the medical service provider system of FIG. 8.

Still referring to FIG. 9, the coordinator system 24 includes authorization 78, registration 80, evaluation 82 and reporting 84 modules. The registration module 80 admits the medical service provider system 28 as a registered user of the coordinator system 24, and also admits the practice management agent systems 30 as registered suppliers of the coordinator system. The authorization module 78 compares the practice management agent system's security data, such as user names and passwords, with the preset security data stored in the coordinator system data storage 52 for the associated medical service provider system 28. Once authorization is granted, the medical service provider system selected practice management agent system 38 is allowed access to the administrative data of the medical service provider system 28.

Continuing to refer to FIG. 9, the evaluation module 82 creates performance data based upon the administrative data processing, such as billing and reimbursement transaction processing, of the practice management agent systems 30. The performance data is used to generate reports to aid the medical service provider system 28 in selection of the practice management agent system 38 from a plurality of practice management agent systems 30. The performance data can also be transferred to the medical service provider system 28 for analysis by the medical service provider system. While performance data based upon the administrative data processing has been shown and described, other performance data may include customer surveys and information from other sources, without departing from the broader aspects of the present invention.

Referring to FIG. 9, the reporting module 84 tracks the transactions containing administrative data which is transferred from the medical service provider system 28 to the practice management agent system 38 and the transactions containing processed administrative data which is transferred from the practice management agent system to the medical service provider system. The transaction data is collected and stored in the coordinator system storage area 52 for audits or report generation. The transaction data can be transferred to the medical service provider system 28 for analysis by the medical service provider system. The confidentiality of medical records is protected during the processing and data transfers performed by the medical service provider system 28, the practice management agent systems 30, and the coordinator system 24. The reporting module 84 tracking of transaction data is independent of the audit trail being created by the medical service provider system 28.

Still referring to FIG. 9, the coordinator system 24 includes a medical service provider billing and reimbursement module 26 which is used by the medical service provider system 28 for creating and handling administrative data, such as super bills, in the coordinator defined data format. The billing and reimbursement module 26 includes a medical service provider administrative data processing module 85, the data security module 54, and the network interface module 76. The medical service provider billing and reimbursement module 26 is downloaded over the network 34 to the medical service provider system 28 directly from the coordinator system's 24 web-site portal. While downloading via the internet has been shown and described, the present invention is not limited in this regard, as the software could also be provided via CD-ROMs, floppy disks, or even in the form of an application service provider which provides the functions of the software without having the program reside within the medical service provider system, can be substituted without departing from the broader aspects of the present invention. While a medical service provider system which utilizes a coordinator originated module for generating coordinator formatted administrative data has been shown and described, the present invention is not limited in this regard, as a medical service provider can utilize software for billing and reimbursement which generates coordinator formatted administrative data, without departing from the broader aspects of the present invention.

The coordinator system 24 operates on an Intel Pentium microprocessor, with a Microsoft Windows operating system and web server software. The coordinator system includes user interface devices such as a keyboard, mouse, display screen, printer and other hardware such as a scanner, and can be a client computer or a server computer. While a coordinator system utilizing an Intel Pentium micro processor and Windows operating system has been shown and described, the coordinator system is not limited in this regard, as the coordinator system may be put together from the various hardware and operating systems available in the market as long as such components are adequately compatible to communicate with the medical service provider system and practice management agent systems, without departing from the broader aspects of the present invention.

Continuing to refer to FIG. 9, the coordinator system 24 includes the data storage 52 in communication with the software modules 86 of the coordinator system. The data storage 52 is preferably a hard disk magnetic or optical storage, although other types of storage, such as flash memory or CD-ROM storage, may be used without departing from the broader aspects of the present invention. The data storage 52 includes a medical service provider database 88 containing data about the medical service provider system 28, and a payer database 90 containing the identification data of payer systems 40 and the types of plans which each payer offers, such as private insurance plan or government plan.

Still referring to FIG. 9, the coordinator system data storage 52 also includes a claims submission database 92 containing super bills, and a claims history database 94 which includes the transaction data for audits or information tracking and reporting. The data storage area 52 also includes a practice management agent database 96 which has data about the registered practice management agents systems 30 and which is used by the medical service provider system 28 for practice management agent selection. The coordinator system 24 also includes a customer account database 98 which includes data regarding medical service provider system account balances and practice management agent systems account balances owed to the coordinator system, and data about patient billing and reimbursement plans, as well as other data used for creating and submitting patient invoices, such as super bills. The coordinator system storage 52 includes an account storage database 99 for storing the administrative data of the medical service provider system 28 which does not have sufficient storage capacity to store its own administrative data or may not wish to store its own administrative data, such as for processing efficiency or security reasons.

Continuing to refer to FIG. 9, a registration database 100 contains registration data denoting the medical service provider system 28 and practice management agent systems 30 who have registered as coordinator system 24 users. The registration database 100 also contains data recording the agency agreement between the medical service provider system 28 and the selected practice management agent system 38, and security related data which the medical service provider system, the coordinator system 24, and the practice management agent system have jointly agreed upon, such as passwords. While coordinator system databases such as, payer, claims submission, and claims history databases, have been shown and described, the present invention is not limited in this regard, as other databases which may become necessary for regulatory or market conditions, such as a Medicaid information database, may be added without departing from the broader aspects of the present invention.

Still referring to FIG. 9, the coordinator system 24 generates a revenue stream by charging the medical service provider system 28 and the practice management agent systems 30 a flat monthly fee for registration and access to the coordinator system 24 regardless of the number of transactions processed through the coordinator system. Alternately, the coordinator system 24 can charge a small transaction fee for every transaction processed through the coordinator system, with certain transactions provided free of charge. In addition, a combination of flat and per-transaction fee may also be used. Fees can also be applied to the payer systems 40, such as insurance companies, as well as the medical service provider system 28 and the practice management agent systems 30. Multiple fee structures can be used in the present invention, with many fee structures used simultaneously based upon the parties and the circumstances.

While the above embodiment describes a single computer acting as the coordinator system, the present invention is not limited in this regard, as the coordinator system functionality could be distributed over a number of machines in a distributed architecture such that the various components of the system are housed in separate hardware units at different physical locations, such as separating the information processing function from the database warehousing function and networking many computers together via a wide area network that function in a synchronized unison to give the appearance of a single coordinator system.

Figure 10:
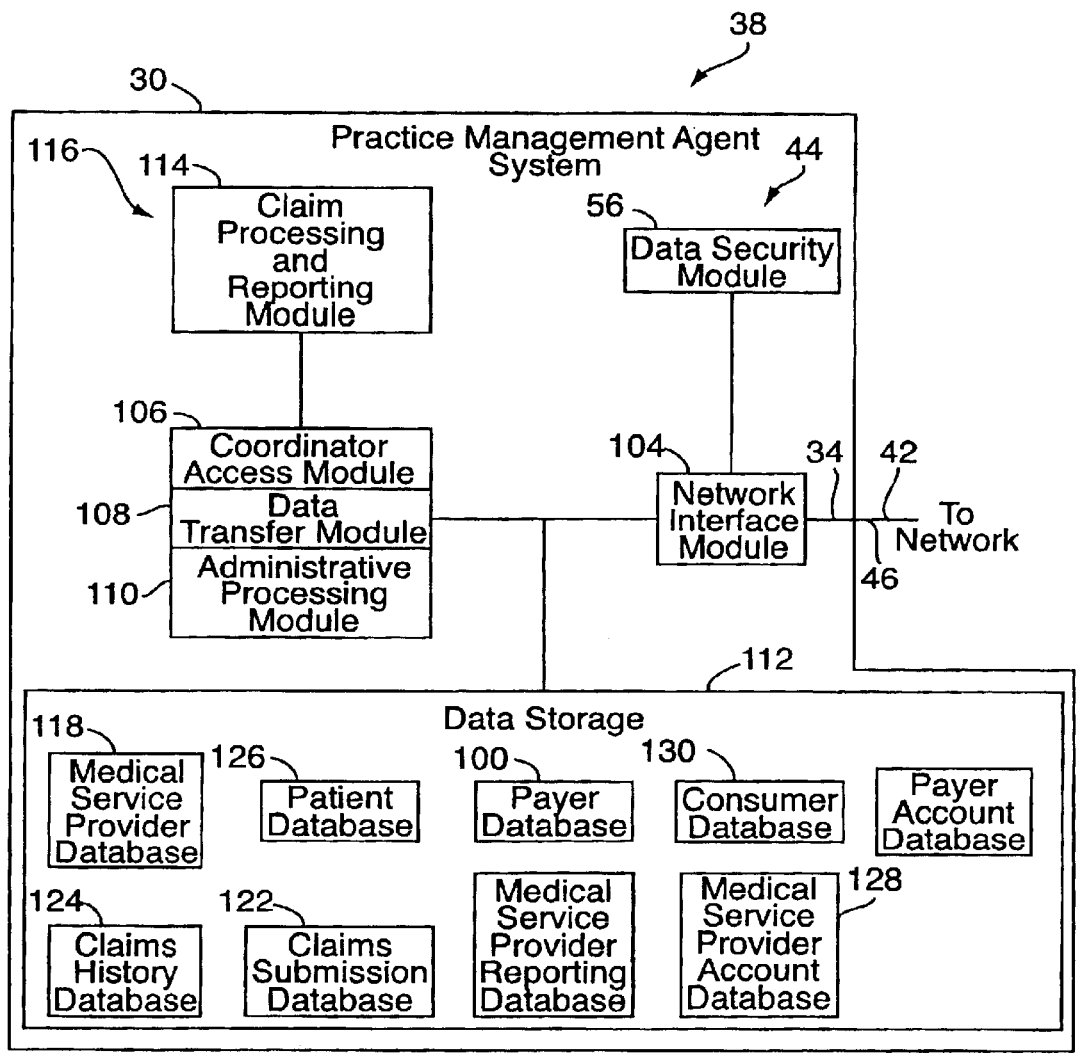
FIG. 10 is a block diagram illustrating a practice management agent computer system, in accordance with the agent neutral system of FIG. 4.

Referring to FIG. 10, the practice management agent systems 30 are suppliers of administrative services to the medical service provider system 28. The practice management agent system 38 selected by the medical service provider system 28 has the responsibility for managing the billing and reimbursement process 10 of the medical service provider system, and is the administrative agent of the medical service provider system in regard to its dealings with payer systems 40, such as insurance companies. The administrative data processing is accomplished by the practice management agent systems 30 without removing control of the administrative process from the medical service provider system 28. The practice management agent systems 30 are required to utilize the administrative data format, processing and administrative standards defined by the coordinator system 24, and utilized by the medical service provider system 28.

Still referring to FIG. 10, the use of a standard administrative data formats, administrative processing and administrative standards by the practice management agent systems 30, the coordinator system 24, and the medical service provider system 28 permits the medical service provider system to switch from one practice management agent system 38 to another practice management agent system 102 without incurring significant financial and operational costs that otherwise would be required for obtaining and installing different computer systems, administrative data formats or administrative procedures to conform with the new practice management agent system, including costs for retraining personnel and an increase in time for performing new or different administrative procedures.

Continuing to refer to FIG. 10, the coordinator interface module 44 for communicating with the medical service provider system 28 and coordinator system 24 using the coordinator defined data formats may be downloaded over the network 34 to the registered practice management agent systems 30 directly from the coordinator system's web-site portal. The coordinator interface module 44 includes the coordinator system network interface module 76 and the coordinator system data security module 54. Alternately, the practice management agent systems 30 can create its own practice management agent software to interface with the coordinator defined administrative data, coordinator system 24 and medical service provider system 28. While downloading via the internet has been shown and described, the present invention is not limited in this regard, as the software could also be provided via CD-ROMs, floppy disks, or even in the form of an application service provider which provides the functions of the software without having the program reside within the practice management agent system, can be substituted without departing from the broader aspects of the present invention.

Continuing to refer to FIG. 10, the practice management agent systems 30 include a network interface module 104 to communicate with the medical service provider system 28 and the coordinator system 24. The network interface module 104 is in communication with the practice management agent data security module 56 for providing end-to-end security infrastructure. The practice management agent systems' data security module 56 is compatible with the medical service provider system's data security module 50 and the coordinator system's data security module 54 and includes the security features described with the medical service provider system 28 shown in FIG. 8.

Still referring to FIG. 10, the practice management agent systems 30 include a coordinator access module 106, a data transfer module 108, and an administrative process module 110. The coordinator access module 106 registers the practice management agent systems 30 with the coordinator system 24. The coordinator access module 106 also presents the practice management agent system security data, such as passwords, to the coordinator system 24 for gaining authorization to access to the administrative data of the medical service provider system 28.

Continuing to refer to FIG. 10, the data transfer module 108 retrieves administrative data from the medical service provider system 28 for processing by the practice management agent system 38. The data transfer module 108 also, in a reverse-transaction, transfers the processed administrative data from the practice management agent system 38 to the medical service provider 28. While retrieving and transferring administrative data from the medical service provider has been shown and described, the present invention is not limited in this regard, as the practice management agent system can retrieve medical service provider administrative data from the coordinator system, and transfer the medical service provider processed administrative data to the coordinator system for the medical service provider system, without departing from the broader aspects of the present invention.

Still referring to FIG. 10, the practice management agent systems 30 administrative processing module 110 tracks incoming and outgoing administrative data, including collecting and storing in data storage 112 all transaction data that would be helpful for audits or information tracking. The transaction data tracked by the administrative processing module 110 is independent of the audit trail being created by the medical service provider system 28. The practice management agent systems 30 also includes a claim processing and reporting module 114 for communicating with payer systems 40, such as insurance companies, managed care companies, and the federal government, in order to proceed with the reimbursement process for the medical service provider 28.

Continuing to refer to FIG. 10, the practice management agent systems 30 preferably include legacy software to communicate and process transactions with the payer systems 40, such as providing administrative data format transformations and operational conversions necessary to complete the administrative data transaction processing with the payer systems. The practice management agent system preferably utilizes an Intel Pentium microprocessor, Microsoft Windows operating system and web server software. The practice management agent systems include user interface devices such as a keyboard, mouse, display screen, printer and other hardware such as a scanner, and can be client computers or server computers. While a practice management agent system including an Intel Pentium microprocessor and Windows operating system has been shown and described, the practice management agent system is not limited in this regard, as the system may be put together from the various hardware and operating systems available in the market as long as such components can be made adequately compatible to communicate with the medical service provider system and coordinator system, without departing from the broader aspects of the present invention.

Continuing to refer to FIG. 10, the practice management agent systems 30 include the data storage 112 in communication with the software modules 116 of the practice management agent systems. The data storage 112 is preferably a hard disk magnetic or optical storage, although other types of storage, such as flash memory or CD-ROM storage, may be used without departing from the broader aspects of the present invention. The data storage 112 includes a medical service provider database 118 containing data about the medical service provider system 28, such as security related data which the medical service provider system, the coordinator system 24, and the practice management agent system 38 have jointly agreed upon, such as passwords. The data storage 112 also includes a payer database 120 containing the identification of payer systems 40 and the types of plans which each payer offers, such as private insurance plan or government plan.

Still referring to FIG. 10, the data storage 112 includes a claims submission database 122 holding medical service provider system invoices, and a claims history database 124 having transaction data for audits and information tracking and reporting. The data storage area 112 also includes a patient database 126 for holding data about the patients of the medical service provider system 28 whose administrative data is processed, such as a patient's medical coverage and payer plan. The practice management agent system data storage 112 also includes a medical service provider account database 128 including data regarding medical service provider account balances owed to the practice management agent system 38, and patient billing and reimbursement plans, as well as data used for transferring and processing patient invoices. A consumer database 130 contains data about the practice management agent systems 30 which is available to the medical service provider system 28 for selecting a practice management agent system 38. While practice management agent system databases, such as payer, claim submission, and claims history databases, have been shown and described, the present invention is not limited in this regard, as other databases which may become necessary for regulatory or market conditions, such as a governmental information database, may be added without departing from the broader aspects of the present invention.

While the above embodiment describes a single computer acting as the practice management agent system, the present invention is not limited in this regard, as the practice management agent system functionality could be distributed over a number of machines in a distributed architecture such that the various components of the system are housed in separate hardware units at different physical locations, such as separating the information processing function from the database warehousing function and networking many computers together via a wide area network that function in a synchronized unison to give the appearance of a single practice management agent system. While the above embodiment describes software modules, the software functions described can be embodied in software, hardware or firmware, and the functions can be implemented with object oriented code or procedural code.

Figure 11A:
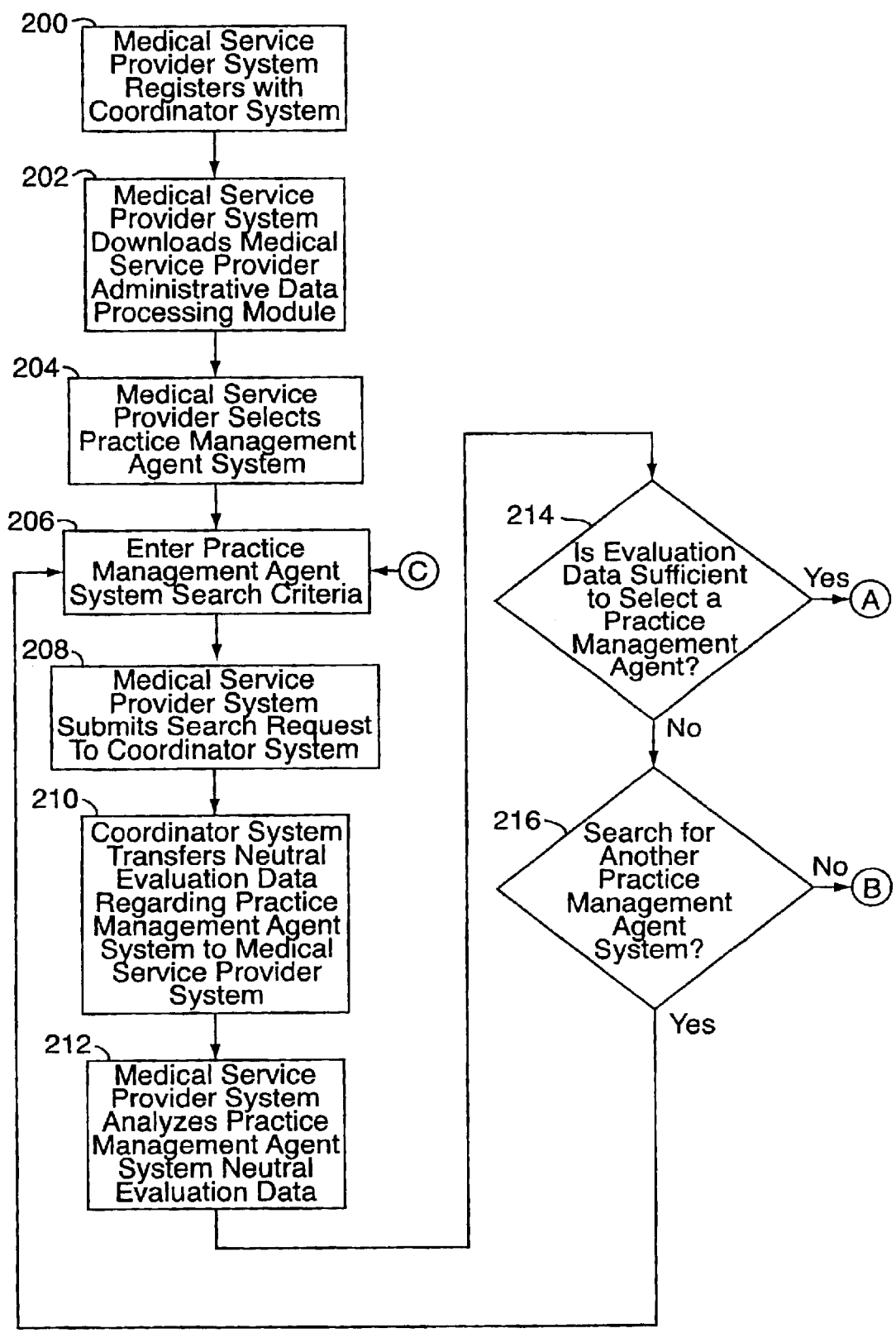
FIGS. 11A and 11B are flow charts illustrating practice management agent selection by the agent neutral system of FIG. 4.
Figure 11B:
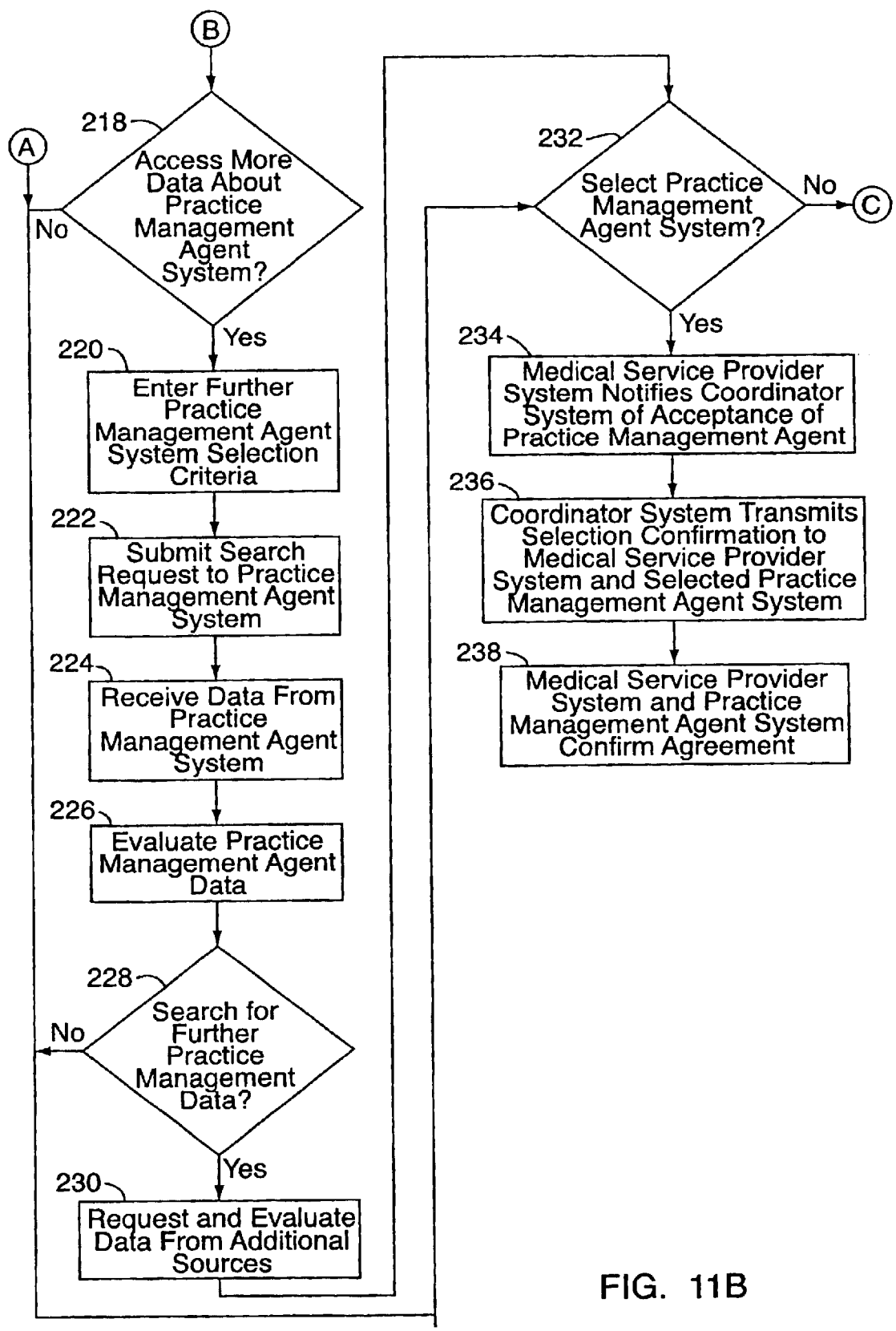

Referring to FIGS. 11A and 11B, the practice management agent system 38 can be selected by the medical service provider system 28 at any time. All registered practice management agents systems 30 utilize the coordinator system 24 data formats and coordinator system defined procedures for processing the medical service provider's administrative data. Therefore the medical service provider system 28 can switch from one practice management agent system 38 to another practice management agent system 102 without incurring costs such as obtaining another type of administrative data entry and transmission software, or reformatting administrative data which was entered prior to switching to another practice management agent system. The agent-neutral coordinator system 24 substantially eliminates costs for switching from the first practice management agent system 38 to a second practice management agent system 102.

Continuing to refer to FIGS. 11A and 11B, and a step 200, the medical service provider system 28 registers with the coordinator system 24 in order to, in a step 202, download the billing and reimbursement module 26 which includes medical service provider system software modules 64 such as the medical service provider administrative data processing module 63 from the coordinator system. In a step 204, the medical service provider system 28 selects a practice management agent system 38 from the practice management agent systems 30 registered with the coordinator system 24 to act as the administrative agent with the payer systems 40 by, in a step 206, entering search criteria, including such various facets of product and service relating to practice management agents, such as price, features, turnaround time, ancillary services, guarantees, and customer service. In a step 208, the medical service provider system 28 submits the search criteria as a search request to the coordinator system 24. In a step 210, the coordinator system 24 transfers the neutral evaluation data which the coordinator system has accumulated regarding practice management agent systems 30 to the medical service provider system 28, and, in a step 212, the medical service provider system analyzes the practice management agent systems' neutral evaluation data.

Still referring to FIGS. 11A and 11B, and in a step 214, the medical service provider system 28 determines whether the evaluation data received from the coordinator system 24 provides sufficient information to select one of the practice management agent systems 38. If the neutral evaluation data is sufficient for the medical service provider system 28 to select the practice management agent system 38, the medical service provider system, in a step 232, decides whether the practice management agent system is to be accepted.

Continuing to refer to FIGS. 11A and 11B, if the neutral evaluation data is not sufficient to for the medical service provider system 28 to select a practice management agent system 38, the medical service provider system, in a step 216, decides whether to search for another practice management agent system, and if so enters new search criteria in the step 206. If a new search is not to be performed, in a step 218, the medical service provider system 28 decides whether more data about the practice management agent systems 30 is to be accessed. If no new data is to be accessed, the medical service provider system 28, in the step 232, decides whether the practice management agent system 38 is to be accepted.

Still referring to FIGS. 11A and 11B, in a step 220, the medical service provider system 28 requests more information about practice management agent systems 30 from the practice management agent systems by entering further practice management agent system selection criteria, and in a step 222, submits the selection criteria as a search request directly to the practice management agent systems. Each practice management agent system 30 searches the consumer database 130 and retrieves the requested data, such as price, features, turnaround time, ancillary services, guarantees, and customer service. The practice management agent systems 30 transfer the retrieved data to the medical service provider system 28, and, in a step 224, the medical service provider receives, and in a step 226, evaluates the retrieved practice management agent system data. While evaluation of a practice management agent has been shown and described, the present invention is not so limited, in that a search request can access evaluation data for multiple practice management agents and the medical service provider can compare the evaluation data for multiple practice management agents, without departing from the broader aspects of the present invention.

Continuing with FIGS. 11A and 11B, in a step 228, the medical service provider system 28 decides to search for further practice management agent evaluation data. If no new evaluation data is to be accessed, the medical service provider system, in the step 232, requests whether the practice management agent is to be accepted. If additional evaluation data is requested, in a step 230, additional sources, such as practice management agent web sites and internet web pages in general, are requested, retrieved and evaluated. In a step 232, the medical service provider system 28 decides whether the practice management agent is to be accepted. If the practice management agent 38 is not accepted, in the step 206, a new criteria for a search for a practice management agent system 30 is entered.

Still referring to FIGS. 11A and 11B, if the practice management agent system 38 is selected, in a step 234, the medical service provider system 28 notifies the coordinator system 24 of acceptance of the practice management agent system. In a step 236, the coordinator system 24 transmits a selection confirmation to the medical service provider system 28 and the selected practice management agent system 38, and in a step 238, the medical service provider system and the selected practice management agent system confirm the selection directly with each other.

Figure 12:
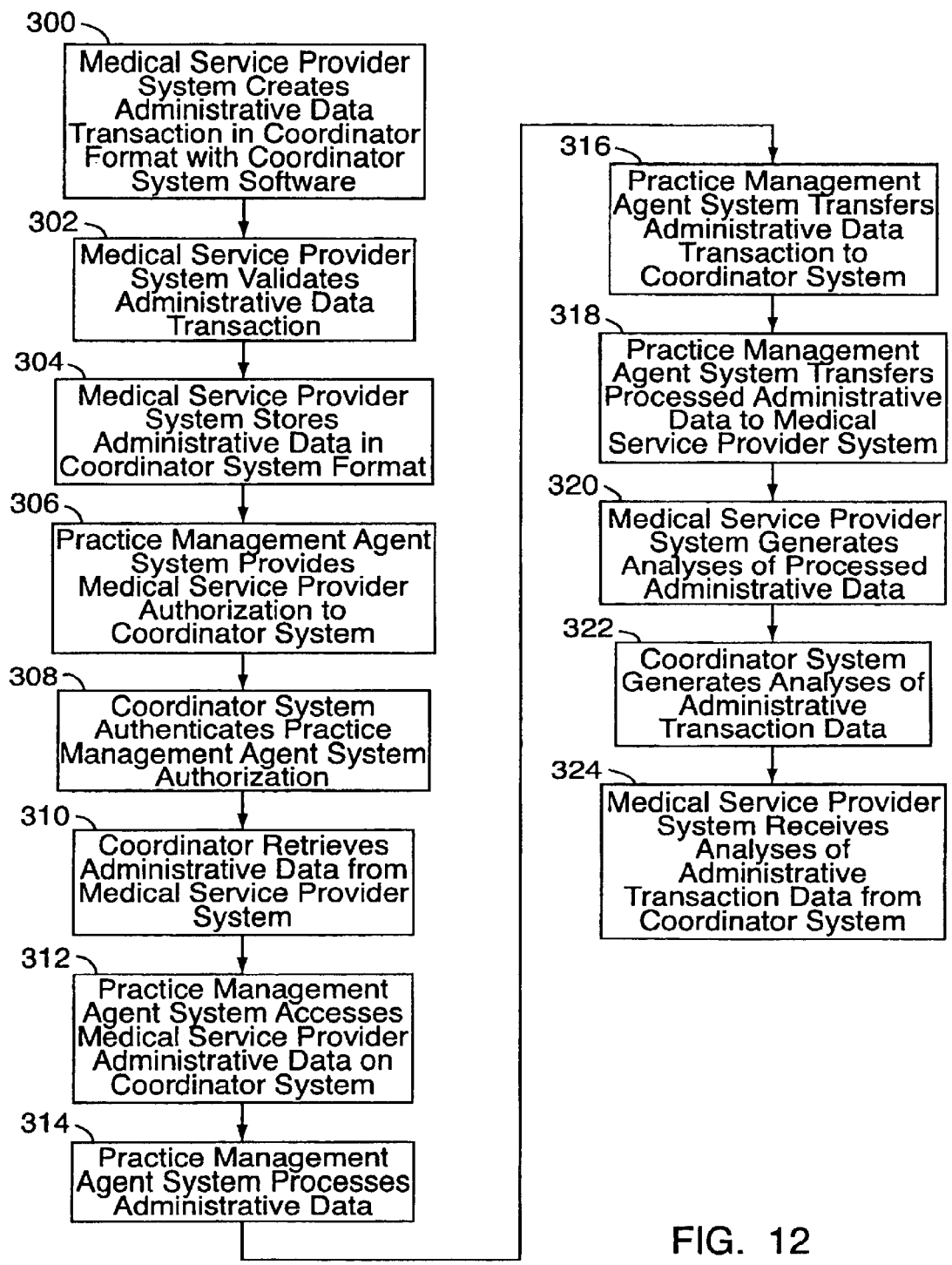
FIG. 12 is a flow chart illustrating administrative data processing by the agent neutral system of FIG. 4.

Referring to FIG. 12, the processing of a medical service provider system's administrative data transaction includes two interdependent groups of procedures: the procedures conducted by the medical service provider system 28 and the procedures conducted by the practice management agent system 38. The medical service provider system 28 schedules the creation of administrative data transactions independent of the practice management agent system's schedule for processing the administrative data transactions. The practice management agent system 38 can access the medical service provider's administrative data transactions at any time after the administrative data's creation. The processing of the administrative data transactions can occur over a period of days, as the practice management agent system 38 processes the medical service provider's administrative data transactions on the practice management agent system's own schedule.

Continuing to refer to FIG. 12, the practice management agent system 38 processes the administrative data transactions of the medical service provider system 28 only with the authorization of the coordinator system 24. In addition, the coordinator system 24 tracks each administrative data transaction and records all processes involving the administrative data transactions, including the status of transactions, in the claims history database 94 in the coordinator system data storage 52.

Still referring to FIG. 12, in a step 300, the user of the medical service provider system 28 enters the administrative data transaction from a record of patient care, such as an examination or a treatment, preferably in the form of a super bill. The administrative data transaction is created using the administrative data processing module 63 which was downloaded, or otherwise received, from the coordinator system 24. The administrative data transaction is created in the data format defined by the coordinator system 24, which is generally compatible and compliant with government requirements, such as Medicare. Individual data fields of the administrative data transaction will change over time as regulatory or market conditions demand, but the fundamental administrative data transaction process would stay the same. While entering administrative data into the administrative data processing module has been shown and described, the present invention is not so limited, in that administrative data could be entered on an encounter information form (generally termed as "super bill" in the trade), such as via HCFA Form 1500 (standard outpatient form of the Health Care Financing Administration, a federal agency), and then entered into the medical service provider system, without departing from the broader aspects of the present invention.

Continuing to refer to FIG. 12, in a step 302, the administrative data processing module 63 performs a debugging process to interactively validate the administrative data by flagging and fixing any obvious coding errors. In a step 304, the "clean" administrative data transaction is captured and stored in the claims database 68 in the data storage 60 on the medical service provider system 28 in the coordinator system 24 defined data format. While storing administrative data transaction on the medical service provider system has been shown and described, the present invention is not so limited, as the medical service provider system administrative data may be stored on the coordinator system if the storage capacity of the medical provider system is not sufficient to store the administrative data, or for processing efficiency or security reasons, without departing from the broader aspects of the present invention. While the entry of medical service provider system administrative data by the medical service provider system has been shown and described, the present invention is not so limited, as the entry of the medical service provider system administrative data can be outsourced to the practice management agent system, which enters and stores the medical service provider system's administrative data in the claim submission database within the coordinator system, without departing from the broader aspects of the present invention.

Continuing to refer to FIG. 12, the practice management agent system 38 processes the medical service provider system 28 administrative data transactions in groups of transactions, or batches, on the practice management agent system's own schedule. While processing groups of transactions has been described, the present invention is not so limited, as a batch of transactions may include only one transaction, such as a super bill, without departing from the broader aspects of the present invention. In a step 306, the practice management agent system 38 utilizes the data security module 56 to provide medical service provider system authorization, such as passwords or digital certificates, to the coordinator system 24 to gain access to the medical service provider administrative data. In a step 308, the coordinator system uses the data security module 54 to verify that the practice management agent system 38 is registered with the coordinator system. The coordinator system 24 also authenticates the authorization of the practice management agent system 38 to access to the administrative data of the particular medical service provider system 28 by matching the practice management agent system's registered clients with the registered medical service provider systems.

Referring to FIG. 12, and in a step 310, the coordinator system 24 retrieves the medical service provider administrative data from the medical service provider system 28 and stores the administrative data in the claims submission database 92 on the coordinator system. In a step 312, the coordinator system 24 allows the practice management agent system 38 to access the administrative data stored in the coordinator system claim submission database 92. While the coordinator system accessing and retrieving the medical service provider administrative data has been shown and described, the present invention is not so limited, as the practice management agent system may access the medical service provider system administrative data directly, and may access administrative data from multiple medical service providers simultaneously, as long as the practice management agent system authorization is authenticated by the coordinator system first, without departing from the broader aspects of the present invention.

Still referring to FIG. 12, and in a step 314, the practice management agent system 38 processes the administrative data transaction, including communicating with the payer systems 40 indicated in the administrative data transactions. The processing of the medical service provider system administrative data can include the credentialing 12 of every medical service provider, such as a medical practice or physician, by each managed care entity on a periodic basis; the service contracts 12 that each medical service provider has to make with the various insurance companies; the process of claim submission 14 to the various payers; the follow-up required 16, from the resubmission of "lost" claims to the petitions against denied claims; the management of the reimbursement information to help the medical service provider's decision-making process 18; and the resolution 20 of continuing issues about patient care or reimbursement for services provided. Such administrative processing with payers 40 is well known in the art and will not be described further.

Continuing to refer to FIG. 12, the payer systems 40 do not necessarily utilize the controller system 24 data formats and procedures, other than utilizing standard interfaces for electronic data interchange (EDI) and information exchange via the internet. The practice management agent systems 30 provide data format transformations or operational conversions necessary to complete the administrative data transaction processing with the payer systems 40. The payer systems 40 preferably make payments to the medical service provider system 28 through the practice management agent system 38; which tracks the payments, and deducts their own fees from the payments. Payment data is also recorded by the coordinator system 24, which provides transaction-based tracking of the payment and administrative data for audits, legal purposes and other analysis, and recorded by the medical service provider system 28. While payer systems making payments indirectly to the medical service provider has been shown and described, the invention is not so limited, as the payer systems may make payments directly to the medical service provider as long as the coordinator system receives notification of the payments from one of the systems, without departing from the broader aspects of the present invention.

Continuing to refer to FIG. 12, and in a step 316, the practice management agent system 38 performs a reverse transaction batch in which the processed administrative data is transferred from the practice management agent system medical service provider reporting database 118 to the coordinator system 24, which stores the processed administrative data in the claims history database 94 and practice management agent database 96 for providing valuable transaction-based tracking ability for audits or legal purposes.

Still referring to FIG. 12, in a step 318, the practice management agent system 38 also transfers the processed administrative data from the practice management agent system medical service provider reporting database 118 to the medical service provider system claims history database 62 for review, reporting, and record keeping by the medical service provider system 28. While transferring processed administrative data to the medical service provider system has been shown, if the medical service provider system 28 does not have the resources, such as sufficient data storage 60, available for storage of the processed administrative data, the practice management agent system 38 transfers the processed administrative data to the account storage database 99 of the coordinator system 24, without departing from the broader aspects of the present invention. The coordinator system 24 provides accounts and storage space within the coordinator system data storage 52 for the medical service provider system 28 at an agreed upon price.

Still referring to FIG. 12, in a step 320, the medical service provider system 28 generates analyses of the processed administrative data. In a step 322, the coordinator system 24 generates analyses of processed administrative transaction data, and, in a step 324, the medical service provider system 28 receives the analyses of the processed administrative transaction data from the coordinator system. In addition, the billing and reimbursement module 36 of the medical service provider system 28 can perform analyses and produce reports utilizing the processed administrative data. The analyses can be stored as a relational file format in the medical service provider system storage area 60.

Figure 5:
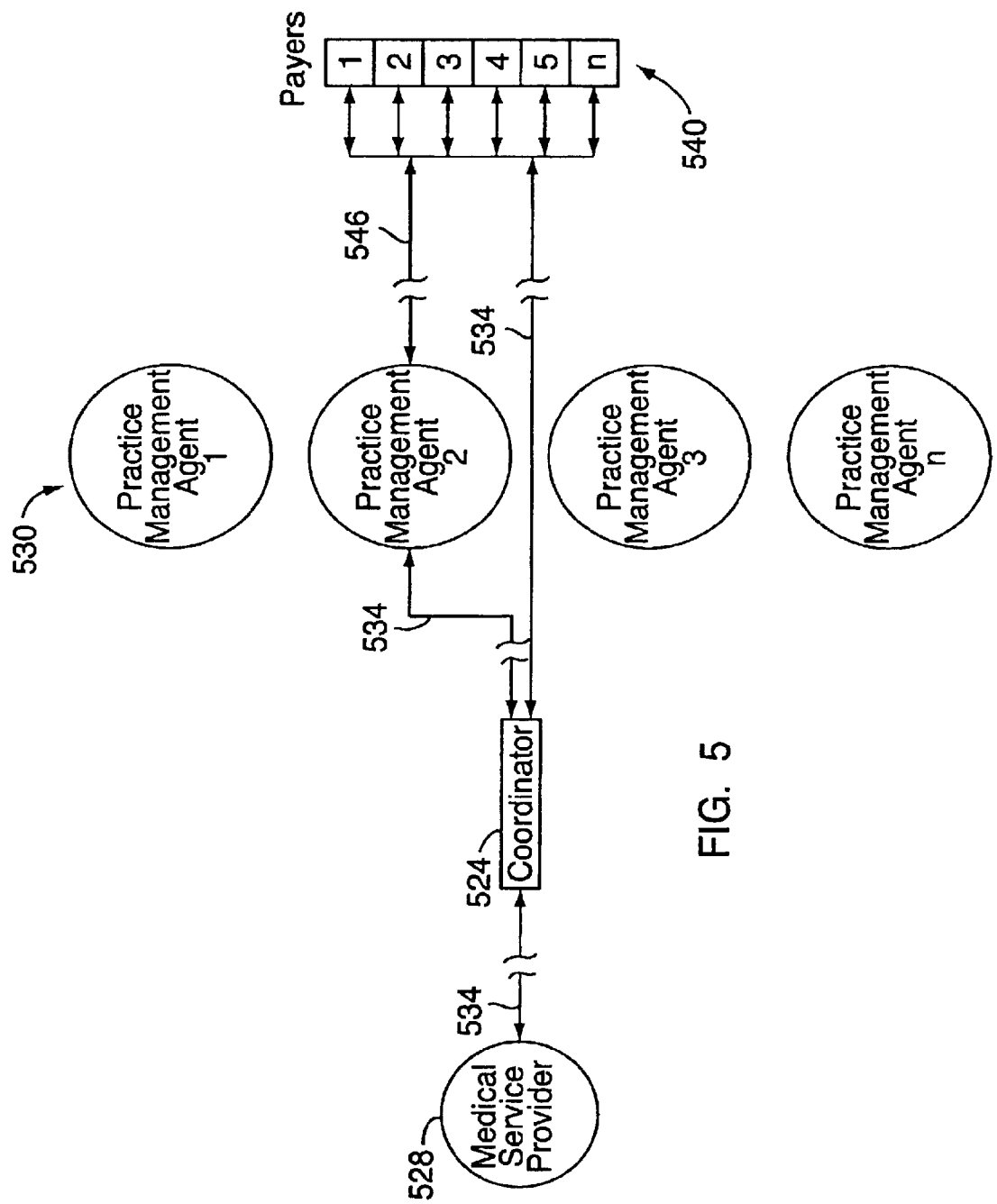
FIG. 5 is a block diagram illustrating a model of a agent-neutral system and methodology implemented on a computer system in accordance with another embodiment of the present invention.

Referring to FIG. 5, in an alternate embodiment of the invention, payer systems 540 utilize standard interfaces for electronic data interchange (EDI) and information exchange via a network 534 such as the internet 534 to make payments to a medical service provider system 528 through a coordinator system 524, which may deduct an operating fee, and pass the payments to the medical service provider system. The communication of practice management agent systems 530 with the payer systems 540 is via such methods 546 as dial-up data lines, as is well known in the art, but communication can be by any other means, such as the internet, without departing from the broader aspects of the present invention. The coordinator system 524 provides transaction-based tracking for audits, legal purposes and other analysis.

Figure 6:
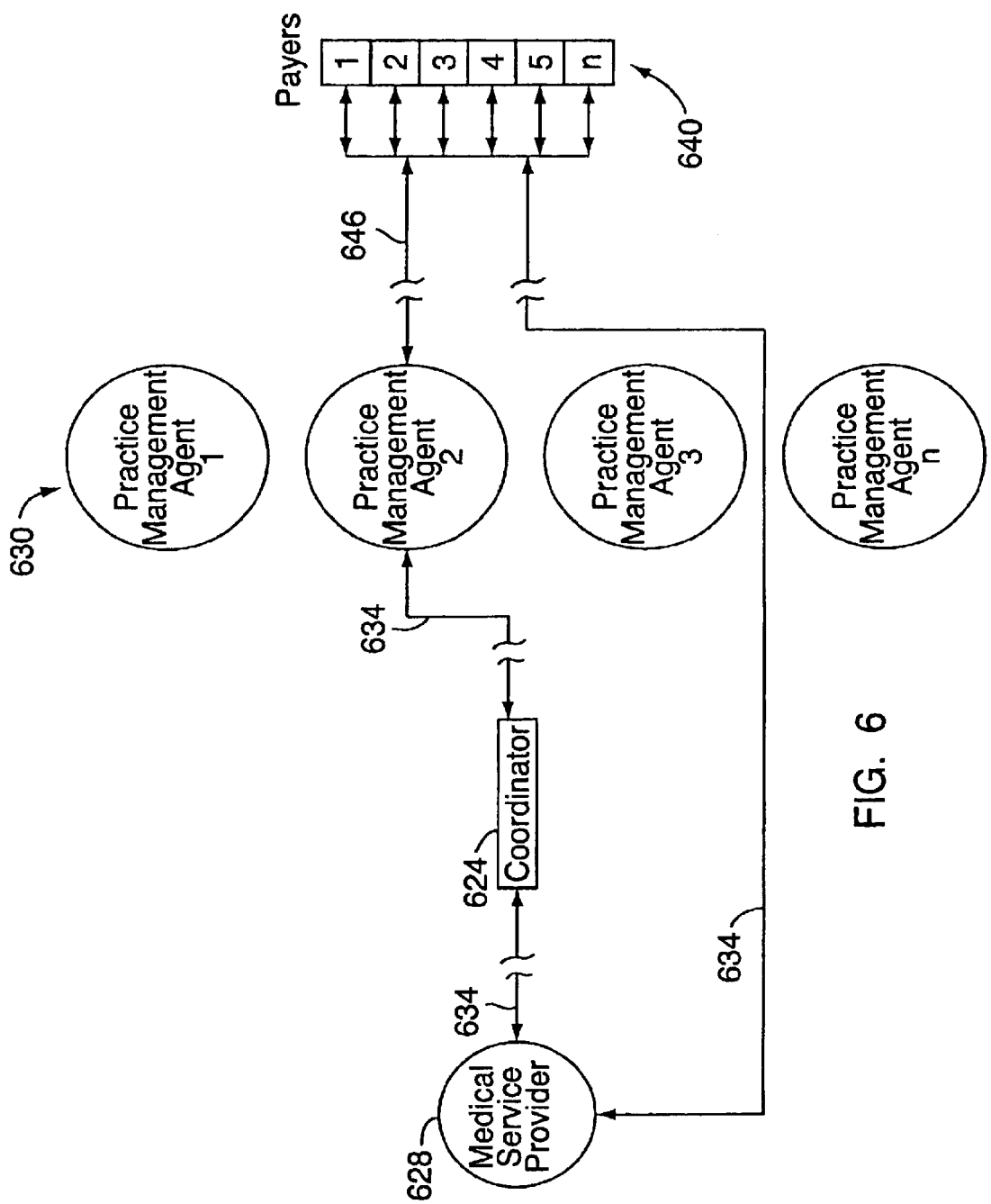
FIG. 6 is a block diagram illustrating a model of a agent-neutral system and methodology implemented on a computer system in accordance with another embodiment of the present invention.

Referring to FIG. 6, in another alternate embodiment of the invention, the payer systems 640 utilize standard interfaces for electronic data interchange (EDI) and information exchange via a network 634 such as the internet 634 to make payments to directly to the medical service provider system 628 or third parties representing the medical service provider system. Data concerning the payment is transferred through the coordinator system 624, which can deduct an operating fee, and pass the payments data to the medical service provider system 628. Alternatively, payment data may be transferred directly to the medical service provider system 628, as long as the coordinator system 624 is updated with the payment data. Communication of practice management agent systems 630 with the payer systems 640 is via such methods 646 as dial-up data lines, as is well known in the art, but communication can be by any other means, such as the internet, without departing from the broader aspects of the present invention. The coordinator system 624 provides transaction-based tracking for audits, legal purposes and other analysis.

Figure 7:
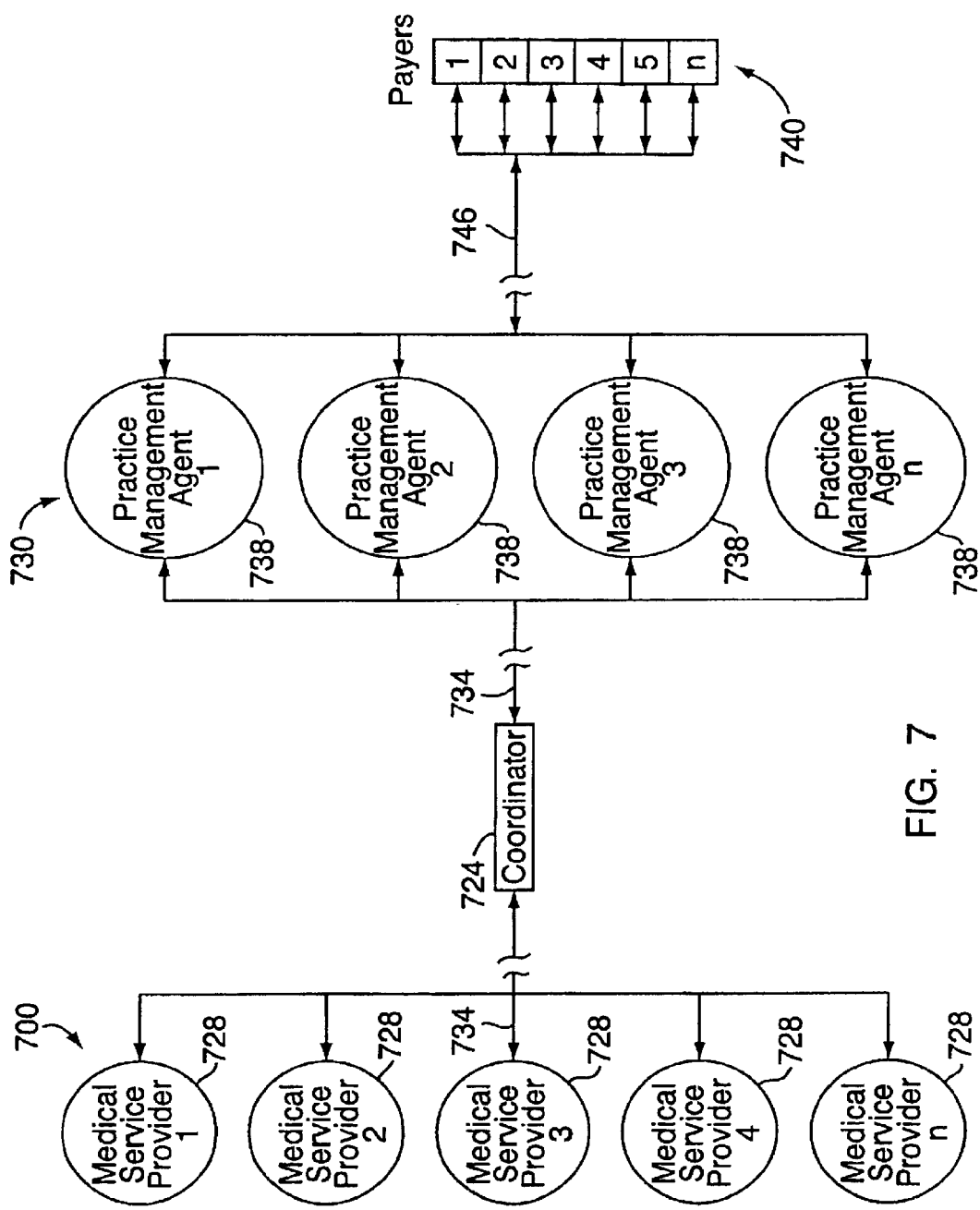
FIG. 7 is a block diagram illustrating the model of a agent-neutral system and methodology implemented on a computer system in accordance with the embodiment of the present invention in FIG. 4.

Referring to FIG. 7, in an alternate embodiment of the invention, multiple medical service provider systems 700 communicate with a coordinator system 724 via a network 734 such as the internet 734. Each 728 of the medical service provider systems 700 is registered with the coordinator system 724, and each medical service provider system has selected a practice management agent system 738 from the group of registered practice management agent systems 730 to act as their administrative agent in working with the payer systems 740. As is shown, a practice management agent system 738 will preferably act as an administrative agent for multiple medical service provider systems 700. A single practice management agent system 738 processes administrative data transactions from multiple medical service provider systems 700 during a single practice management agent system batch process. Communication of the practice management agent systems 730 with payer systems 740 is via such methods 746 as dial-up data lines, as is well known in the art, but communication can be by any other means, such as the internet, without departing from the broader aspects of the present invention. While five medical service provider systems, four practice management agent systems, and six payer systems have been shown and described, the present invention is not limited in this regard, as a virtually unlimited number of medical service provider systems, and practice management agents can interact with a coordinator system, without departing from the broader aspects of the present invention.

In summary, the present invention is a method and system for reducing costs to medical service providers, especially small medical practices, by establishing an agent-neutral coordinator which systemizes the outsourcing of administrative processes to practice management agents. The agent-neutral coordinator creates and maintains agent-neutral operational standards and agent-neutral internet-integrated computer system standards, where agent-neutral means that the practice management agents comply with the coordinator system's operational and data processing standards and software standards, thereby substantially eliminating costs to the medical service provider for switching between the practice management agents. The coordinator system registers the practice management agent systems to act as intermediaries between the medical service provider systems and the insurance companies and payer systems using the coordinator's agent-neutral operational standards and agent-neutral computer system standards. The coordinator system provides data access authorization and security between the medical service provider system and the practice management agent systems, and an analysis of the practice management's agents' effectiveness in performing administrative services for the medical service provider and other medical service providers. The practice management agent systems fulfill the administrative services of the medical service provider, such as billing and reimbursement, including collection, credentialing, and contracting with insurance companies and payers, while the medical service provider retains control of the administrative decision-making process. The increased ability of the medical service provider to switch between the practice management agents provides an increased level of competition between the practice management agents, thereby reducing costs to the medical service provider.

It should be understood that the foregoing description is only illustrative of the invention. Various alternatives and modifications can be devised by those skilled in the art without departing from the broader aspects of the present invention. For instance, while a method and system for obtaining practice management agent system evaluation data has been shown and described, the steps of the disclosed method and system may also be accomplished manually by the coordinator, practice management agent and medical service provider. Accordingly, the present invention encompasses a number of alternatives, modifications and variants that fall within the scope of the appended claims.

What is claimed is:

1. A computerized method for processing administrative data of a service provider, comprising the steps of:

defining standard administrative data formats for use by service provider systems, a coordinator system, and a plurality of practice management agent systems, said practice management agent systems being independent of payer systems, in creating and processing administrative data, said administrative data formats are defined by the coordinator system through the use of software on a computer;

receiving administrative data from said medical service provider, said administrative data including billing, reimbursement, credentialing, preauthorization and collection data;

formatting said administrative data using said standard administrative data formats;

providing formatted administrative data to a practice management agent system for processing, said processing including providing the formatted administrative data to payer systems;

tracking the formatted administrative data transferred between said service provider system and said practice management agent systems, said administrative data tracked by said coordinator system through the use of software on a computer;

creating objective, historical evaluation data from the tracked formatted administrative data transferred between said service provider system and said practice management agent systems, said objective, historical evaluation data consisting of price, features, turnaround time, ancillary services, guarantees, and customer service information, said evaluation data created by said coordinator system through the use of software on a computer; and providing said objective, historical evaluation data to said service provider system for evaluation and selection of a practice management agent system from the plurality of practice management agent systems, said evaluation data provided by the coordinator system to said service provider system over an electronic network.

2. The method of claim 1, further comprising the step of providing software modules from said coordinator system to said service provider system for generating said administrative data transactions in said standard administrative data formats.

3. The method of claim 1, further comprising the step of providing software modules from said coordinator system to said practice management agent systems for processing said administrative data transactions in said standard administrative data formats.

4. The method of claim 1, further comprising the step of registering with said coordinator system said selection of said practice management agent system by said service provider system.

5. The method of claim 1, further comprising the steps of:

evaluating security data provided to said coordinator system by said practice management agent system for accessing said administrative data of said service provider; and authorizing said access to said administrative data for said practice management agent system by said coordinator system.

6. An agent-neutral computerized system for providing administrative services for a medical service provider, comprising:

means for defining standard administrative data formats for use by service provider systems, a coordinator system, and a plurality of practice management agent systems, said practice management agent systems being independent of payer systems, in creating and processing administrative data;

means for receiving administrative data from said service provider, said administrative data including billing, reimbursement, credentialing, preauthorization and collection data;

means for formatting said administrative data using said standard administrative data formats;

means for providing formatted administrative data to a practice management agent system for processing, said processing including providing the formatted administrative data to payer systems;

means for tracking the formatted administrative data transferred between said service provider system and said practice management agent systems;

means for creating objective, historical evaluation data from the tracked formatted administrative data transferred between said service provider system and said practice management agent systems, said objective, historical evaluation data consisting of price, features, turnaround time, ancillary services, guarantees, and customer service information; and means for providing said objective, historical evaluation data to said service provider system for evaluation and selection of a practice management agent system from the plurality of practice management agent systems.

7. A system for providing administrative services for a medical service provider, comprising:

a coordinator system for standardizing administrative data formats for processing administrative data of a medical service provider system by a first medical practice management agent system, said medical practice management agent systems being independent of payer systems, said coordinator system providing data access authorization and security for said administrative data of said medical service provider system to said first medical practice management agent system, and for providing evaluation data from said first medical practice management agent system for evaluation by said medical service provider system;

a billing and reimbursement module located within the coordinator system, said billing and reimbursement module enabling the processing of the administrative data by providing the standardized data formats for processing by the medical practice management agent systems;

an interface module located within the coordinator system for accessing the administrative data generated in the standardized data format, said interface module transfers the administrative data to the medical practice management agent systems and transfers processed data from the medical practice management agent systems to the medical service provider system;

an evaluation module located within the coordinator system for creating historical performance data based upon administrative data processing by said medical practice agent systems;

a first communication link between said medical service provider system and said coordinator system;

a second communication link between said medical practice agent system and said coordinator system;

wherein said standardized administrative data format substantially eliminates costs incurred by said medical service provider system for switching from said first medical practice management agent system to a second medical practice management agent system; and wherein said administrative data includes billing, reimbursement, credentialing, preauthorization and collection data.

8. The system in claim 7, wherein said standard data format includes coordinator-set operational standards and computer system interface standards.

* * * * *